(12) United States Patent
Peng et al.

(10) Patent No.: US 9,491,766 B2
(45) Date of Patent: Nov. 8, 2016

(54) DEVICE-TO-DEVICE COMMUNICATION SCENARIO

(75) Inventors: Tao Peng, Beijing (CN); Qianxi Lu, Beijing (CN); Haiming Wang, Beijing (CN); Tao Chen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/991,706

(22) PCT Filed: Dec. 8, 2010

(86) PCT No.: PCT/CN2010/079565
§ 371 (c)(1),
(2), (4) Date: Jun. 5, 2013

(87) PCT Pub. No.: WO2012/075630
PCT Pub. Date: Jun. 14, 2012

(65) Prior Publication Data
US 2013/0273926 A1    Oct. 17, 2013

(51) Int. Cl.
*H04L 12/42* (2006.01)
*H04L 12/403* (2006.01)
*H04W 72/04* (2009.01)
*H04B 7/155* (2006.01)
*H04W 84/04* (2009.01)

(52) U.S. Cl.
CPC ....... *H04W 72/048* (2013.01); *H04B 7/15528* (2013.01); *H04W 72/042* (2013.01); *H04W 84/047* (2013.01)

(58) Field of Classification Search
CPC ........... H04W 72/04; H04W 72/0406; H04W 72/0413; H04W 72/042; H04W 72/0426; H04W 72/0433; H04W 72/0453; H04W 72/046; H04W 72/048; H04W 72/12–72/1294; H04W 52/46; H04B 7/14; H04B 7/15564

USPC ....... 455/450, 451, 452.1, 509; 370/502–520
See application file for complete search history.

(56) References Cited

U.S. PATENT DOCUMENTS

| 6,477,389 | B1* | 11/2002 | Kim ............................... 455/522 |
| 6,567,459 | B1* | 5/2003 | Hakkinen et al. ............ 375/132 |
| 2006/0099986 | A1* | 5/2006 | Vaittinen et al. ............. 455/522 |

(Continued)

FOREIGN PATENT DOCUMENTS

| WO | 2010013980 | 2/2010 |
| WO | 2010016693 | 2/2010 |

(Continued)

OTHER PUBLICATIONS

International Search Report received for corresponding Patent Cooperation Treaty Application No. PCT/CN2010/079565, dated Sep. 22, 2011 , 2011, 3 pages.

*Primary Examiner* — Rafael Pérez-Gutiérrez
*Assistant Examiner* — Mark G. Pannell
(74) *Attorney, Agent, or Firm* — Mintz Levin Cohn Ferris Glovsky and Popeo, P.C.

(57) ABSTRACT

A method, apparatus, and computer program for supporting simultaneous multi-use of resources of a backhaul link between a relay base station and another base station of a cellular radio network. The relay base station is configured to forward transmission resources of the backhaul link to at least one communication device located in a cell of the relay base station. The communication device(s) is/are then configured to utilize the resources of the backhaul link for device-to-device connections.

21 Claims, 3 Drawing Sheets

(56) References Cited

U.S. PATENT DOCUMENTS

| | | | |
|---|---|---|---|
| 2007/0103324 A1* | 5/2007 | Kosuge et al. | 340/618 |
| 2007/0265026 A1* | 11/2007 | You et al. | 455/522 |
| 2009/0034447 A1* | 2/2009 | Yu et al. | 370/315 |
| 2009/0053994 A1* | 2/2009 | Senarath et al. | 455/11.1 |
| 2010/0002656 A1* | 1/2010 | Ji et al. | 370/336 |
| 2010/0290381 A1* | 11/2010 | Gu et al. | 370/311 |
| 2011/0021221 A1* | 1/2011 | Kondo | 455/501 |
| 2011/0103292 A1* | 5/2011 | Pasad et al. | 370/315 |
| 2011/0134827 A1* | 6/2011 | Hooli et al. | 370/315 |
| 2011/0159914 A1* | 6/2011 | Chen et al. | 455/522 |
| 2012/0069790 A1* | 3/2012 | Chung et al. | 370/315 |
| 2012/0258706 A1* | 10/2012 | Yu et al. | 455/426.1 |
| 2012/0269178 A1* | 10/2012 | Li et al. | 370/336 |

FOREIGN PATENT DOCUMENTS

| | | | | |
|---|---|---|---|---|
| WO | 2010101366 | | 9/2010 | |
| WO | WO 2010/134749 A2 * | 11/2010 | | H04W 72/00 |

\* cited by examiner

DEVICE-TO-DEVICE COMMUNICATION SCENARIO

FIELD

The invention relates to the field of cellular radio telecommunications and, particularly, to communicating over a device-to-device connection in a cellular telecommunication system.

BACKGROUND

Integration of new network topologies into a cellular radio network gains more and more attraction and interest in both industry and academic instances. Some examples of the integration include heterogeneous networks related to deployment of macro, micro, pico, femto and relay cells in the same spectrum in an UMTS LTE or LTE-A (Universal Mobile Telecommunication System Long-Term Evolution-Advanced) of 3GPP ($3^{rd}$ Generation Partnership Project). A step further is to enable heterogeneous local communication directly among devices and machines in the resources of the cellular radio network. Heterogeneous local communication may be defined to include direct device-to-device communications (between two terminal devices), communication within a cluster of terminal devices, a grid of local machines communicating with each other while performing other tasks, an advanced terminal device acting as a gateway or a relay for a group of low-capacity devices or machines in order to provide access to the cellular radio network, and secondary utilization of cellular system spectrum.

BRIEF DESCRIPTION

Methods, apparatuses, and articles of manufacture, including computer program products, are provided for protecting executable memory space. According to an aspect of the present invention, there is provided a method. The method may include: receiving, at a relay base station of a cellular radio network, parameters defining transmission resources for a backhaul link between the relay base station and another base station of the cellular radio network; transmitting, by the relay base station, at least some of the received parameters of the backhaul link to at least one communication device operating in a cell covered by the relay base station so as to enable simultaneous multi-utilization of-the transmission resources of the backhaul link; communicating, by the relay base station, relay data in the transmission resources defined by the received parameters; and transmitting, by the relay base station, interference control information to the at least one communication device, wherein the interference control information includes interference information for the at least one device-to-device link that utilizes the transmission resources of the backhaul link, and wherein the interference information includes a threshold parameter that limits, when the at least one communication device is utilizing the transmission resources of the backhaul link for the at least one device-to-device link, transmission power of the at least one communication device.

In some variations, one or more features disclosed herein including the following features can optionally be included in any feasible combination. The method may further include: receiving, at the relay base station, an information element indicating static transmission timing assigned to the relay base station for use in the backhaul link; and transmitting, by the relay base station, the static transmission timing of the backhaul link to the at least one communication device. Alternately or additionally, the method may further include: receiving, at the relay base station, a frequency resource allocation assigned to the relay base station; and transmitting, by the relay base station, the frequency resource allocation to the at least one communication device. In some variations, the method may further include: broadcasting, by the relay base station, at least some of the received parameters of the backhaul link to the at least one communication device on a radio broadcast control channel.

Methods, apparatuses, and articles of manufacture, including computer program products, are provided for protecting executable memory space. According to an aspect of the present invention, there is provided a method. The method may include: receiving, at a first communication device located in a cell covered by a relay base station of a cellular radio network, a message comprising parameters defining transmission resources for a backhaul link between the relay base station and another base station of the cellular radio network; determining, by the first communication device, the transmission resources of the backhaul link from the received message; utilizing, by the first communication device, the transmission resources of the backhaul link for a device-to-device link established between the first communication device and a second communication device, and receiving, at the first communication device, interference control information sent from the relay base station, wherein the interference control information includes interference information for the device-to-device link that utilizes the transmission resources of the backhaul link, and wherein the interference information includes a threshold parameter that limits, when the first communication device is utilizing the transmission resources of the backhaul link for the device-to-device link, transmission power of the first communication device.

In some variations, one or more features disclosed herein including the following features can optionally be included in any feasible combination. The method may further include: determining, by the first communication device, transmission timing and frequency resources of the backhaul link, and communicating, by the first communication device, over the device-to-device link in the transmission timing and the frequency resources of the backhaul link. Alternately or additionally, the method may further include: receiving, at the first communication device, an interference control parameter, determining, by the first communication device, transmission power for the device-to-device link on the basis of the received interference control parameter; and causing transmission over the device-to-device link in the transmission resources of the backhaul link with the determined transmission power.

LIST OF DRAWINGS

Some embodiments of the invention are described below, by way of example only, with reference to the accompanying drawings, in which FIG. 1 illustrates an embodiment of a communication scenario to which some embodiments of the invention may be applied;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
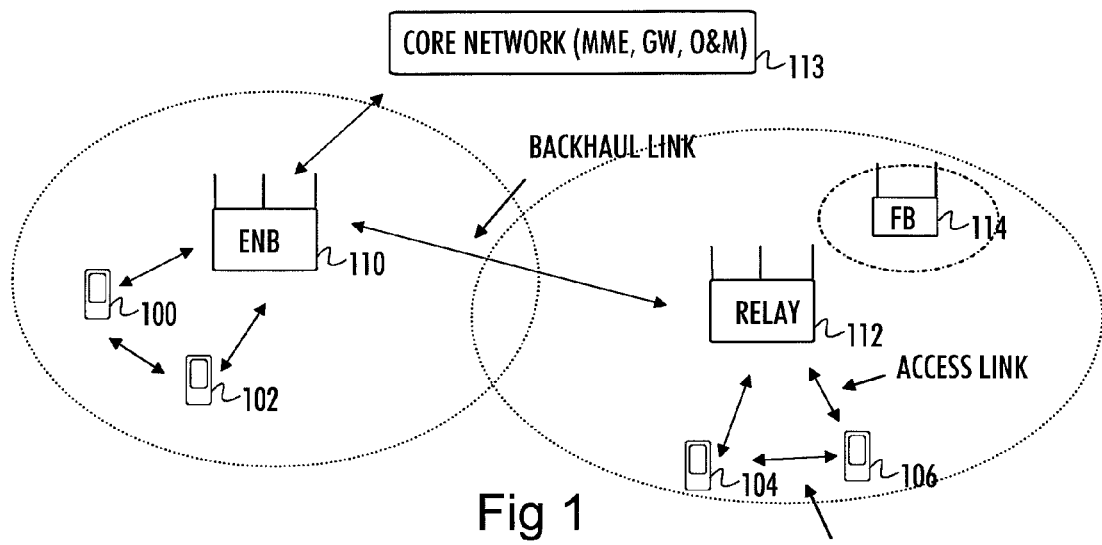

An example of a general architecture of a cellular telecommunication system providing mobile terminals with voice and data transfer services is illustrated in FIG. 1. The cellular telecommunication system illustrated in FIG. 1 is based on UMTS LTE (Universal Mobile Telecommunication System Long-Term Evolution) specification, but the invention is not limited to that. In some embodiments, the cellular telecommunication system supports other system specifications, e.g. IEEE 802.11x (WiFi), WiMAX (Worldwide Interoperability for Microwave Access), other versions of the UMTS (Wideband Code Division Multiple Access, High-speed Packet Access), GSM (Global System for Mobile Communications) and its extensions (General Packet Radio Service, Enhanced Data Rates for GPRS Evolution), and CDMA2000 and its extensions, e.g. Evolution-Data Optimized. In principle, some embodiments of the invention may be realized in any cellular radio system. FIG. 1 illustrates an example of a radio access network of the cellular telecommunication system comprising base stations 110, 112 serving terminal devices 100, 102 and 104, 106, respectively. UMTS LTE systems incorporate relay extension, according to which relay base stations or relay nodes are disposed in order to improve coverage and capacity of the cellular telecommunication system. The relay base stations function as relays between (central) base stations and terminal devices. In FIG. 1, the base station denoted by numeral 110 is the central base station, and the base station denoted by numeral 112 is the relay base station. In the UMTS LTE system, the central base station 110 is called enhanced Node B (eNB), and the relay base station 112 is called relay node (RN). The relay node 112 functions as a relay between terminal devices 104, 106 and the eNB 110. The base stations 110, 112 communicate with the terminal devices 100 to 106 over a radio interface and, additionally, with each other over a wireless connection. The wireless connection between the central base station and the relay base station is called a backhaul link, while a radio interface between the terminal devices 104, 106 and the relay base station is called an access link. The relay base station 112 may be configured to time-division-multiplex the backhaul link and the access link such that it communicates over only one of the backhaul link and the access link at a time. Uplink and downlink transmissions in the backhaul link may be time-division-multiplexed (or time-division duplexed). Downlink transmissions of the backhaul link may be carried out by using a multicast-broadcast single-frequency network frames (MBSFN in the UMTS LTE).

The central base station 110 is connected to a core network 113 of the cellular telecommunication system. The core network 113 may comprise a mobility management entity (MME) controlling operation of the cellular telecommunication system according to mobility of the terminal devices 100 to 106, a gateway node (GW) handling data routing, and an operation and maintenance server (O&M) controlling operating parameters and configurations, e.g. allocation of identifiers, in a radio access network and in the core network.

The cellular telecommunication system is configured to provide the terminal devices 100 to 106 with cellular telecommunication connections connecting the terminal devices to each other and to other networks through the cellular telecommunication system. Additionally, the cellular telecommunication system is configured to support direct device-to-device (D2D) connections between the terminal devices, wherein the D2D connections utilize the frequency spectrum of the cellular telecommunication system. In an embodiment, the D2D connections utilize at least one of downlink and uplink frequency spectrum of the cellular telecommunication system. It should be noted that a D2D connection refers to a connection established over a radio interface between two wireless communication devices such that the D2D connection is not routed through the radio access network of the cellular telecommunication system, e.g. the D2D connection consists the radio link between the two terminal devices of the cellular telecommunication system or any two communication devices in the cell of the relay base station. In some embodiments, the D2D connection refers to a cellular connection in a femtocell established in an ad hoc manner in the coverage area of the cellular telecommunication system. By definition, a femtocell is a cell formed by a small cellular base station, typically designed for use in a home or a small business. In some embodiments, such a femtocell base station (FB) 114 is called a home Node B. It connects to a service provider's cellular network via broadband (such as DSL (Digital Subscriber Line) or cable). However, a wireless connection between the femtocell base station and the cellular telecommunication system is also a feasible solution. Some designs of the femtocell support 2 to 4 active terminal devices in a residential setting, and 8 to 16 active terminal devices in enterprise settings. A femtocell allows service providers to extend service coverage indoors, especially where access would otherwise be limited or unavailable. FIG. 1 illustrates a femtocell covered by a femtocell base station 114 inside the coverage area of the relay base station 112. With respect to femtocells, the D2D connection refers to connection between the femtocell base station and a terminal device served by the femtocell base station.

Figure 2:
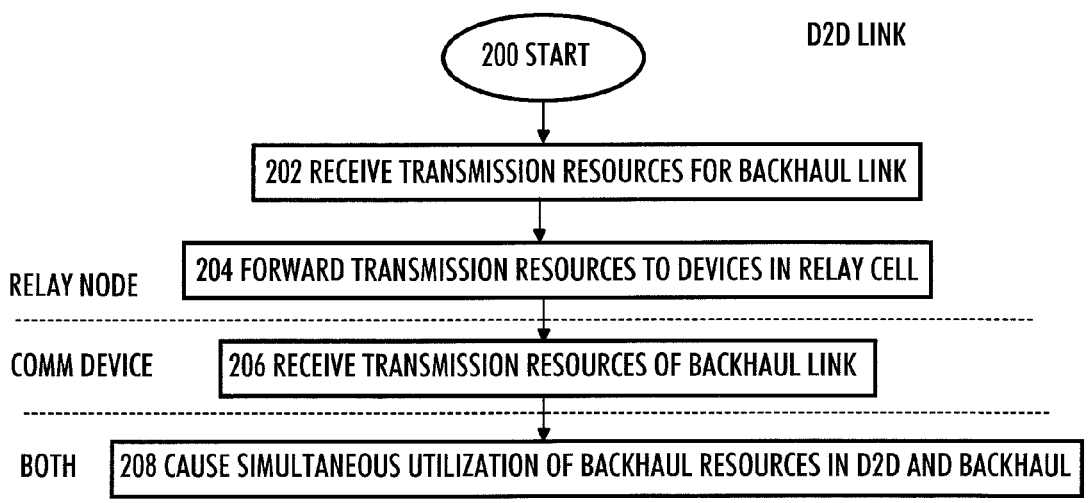
FIG. 2 illustrates a process for supporting simultaneous multi-use of backhaul link resources according to an embodiment of the invention.

In some embodiments of the present invention, resources of the backhaul link are utilized by D2D connections. The central base station 110 and the relay base station 112 may be configured to apply directional antennas to the backhaul link. The result is that the transmissions over the backhaul link cause reduced interference outside a signal path of the backhaul link. Therefore, the radio resources of the backhaul link may be in simultaneous use elsewhere in a cell of the relay base station and/or the central base station. FIG. 2 illustrates an example of a flow diagram of a process for enabling multi-use of the backhaul link resources. The process of FIG. 2 includes steps that are carried out in the relay node 112 and steps carried out in a communication device located in a coverage area of the relay node. The communication device may be the terminal device 104, 106 or the femtocell base station 114. Referring to FIG. 2, the process starts in block 200. In block 202, the relay base station 112 receives a control message defining transmission resources for the backhaul link. In an embodiment, the control message indicates at least one of a transmission time interval and frequency resources of the backhaul link. The control message may relate to uplink resources and/or downlink resources of the backhaul link, and the control message may be received on a relay physical downlink control channel (R-PDCCH) from the central base station 110. In another embodiment, the control message may be a higher layer message defining at least one sub-frame statically used for the uplink/downlink transmissions in the backhaul link. By definition, the downlink of the backhaul link is the transmission direction from the central base station to the relay base station, and the uplink of the backhaul link is the transmission direction from the relay base station to the central base station. In block 204, the relay base station forwards information on at least some of the resources of the backhaul link received in block 202 to at least one communication device operating in the cell covered by the relay base station 112 so as to enable simultaneous multi-utilization of the transmission resources of the backhaul link. The information may be included in a downlink control message transmitted by the relay base station 112 on a broadcast channel or on another physical layer control channel. In some embodiments, the relay base station may transmit the control message to the femtocell base station 114 via a wired link between the relay base station 112 and the femtocell base station 114.

In block 206, the communication device 104, 106, 114 receives the message defining the transmission resources of the backhaul link. The communication device 104, 106, 114 is then configured to extract the received message and determine the transmission resources of the backhaul link from the received message. In block 208, the relay base station 112 and the communication device utilize the transmission resources of the backhaul link in both the backhaul link and in a device-to-device radio link established between the communication device and another communication device, thereby realizing simultaneous multi-use of the resources of the backhaul link. Accordingly, some embodiments of the invention may enable spatial simultaneous multi-use of the backhaul link resources in the coverage area of the relay base station 112. This may improve, for example, spectral efficiency of the system. It should be understood that the D2D connections may use other transmission resources as well, e.g. the transmission resources of the access links.

Figure 3:
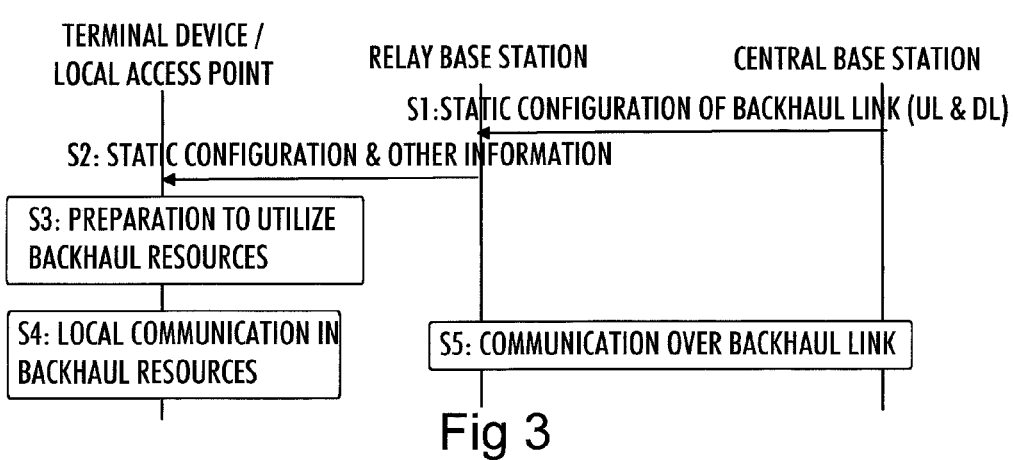
FIG. 3 illustrates a signaling diagram of configuring the simultaneous multi-use of the backhaul resources according to an embodiment of the invention.

FIG. 3 illustrates an example of a signaling diagram for configuring the multi-use of the backhaul link resources according to an embodiment of the invention. The signaling diagram of FIG. 3 illustrates operation of the central base station 110, relay base station 112, and a communication device located in the cell of the relay base station, e.g. the terminal device 104, 106 or the femtocell base station 114. Referring to FIG. 3, the central base station determines at least a transmission time interval (TTI) and frequency resource allocation for the backhaul link and transmits the determined transmission resources (the TTI and the frequency resource allocation) to the relay base station in S1. The TTI and the frequency resources may be transmitted in separate control messages. For example, the TTI may be a static parameter, and it may be configured when setting up the relay base station. The TTI may comprise one or a plurality of sub-frames the relay base station is allocated to use periodically. Separate TTIs may be provided for uplink and the downlink transmissions over the backhaul link, and both TTIs may be static. The frequency resources may also be configured as a static or semi-static parameter, e.g. the same frequency resources may be used for a plurality of TTIs without individual frequency resource scheduling for each TTI. The frequency resources of the backhaul link may be configured as a dynamic, semi-static, or a static parameter. In some embodiments, uplink frequency resources and the downlink frequency resources are different in terms of static nature. For example, the downlink frequency resources may be configured as a static or semi-static parameter, while the uplink frequency resources are scheduled dynamically. The locations of the central base station 110 and the relay base station 112 may be fixed and, thus, a radio channel between them may be static or relatively static. Because of the lack of mobility, abrupt fading of some frequency components may be rare, and thus static or at least semi-static frequency resource scheduling may be used. In order to improve the flexibility of the frequency resource scheduling, the central base station may, however, apply dynamic frequency resource scheduling for the backhaul link. The dynamically scheduled frequency resource allocation may be transmitted from the central base station 110 to the relay base station 112 on the R-PDCCH.

Upon reception of the transmission resource parameters for the backhaul link, the relay base station is configured to apply the allocated transmission resource parameters to the backhaul link communications. Downlink data transfer over the backhaul link may be carried out on a relay physical downlink shared channel (R-PDSCH), while data transfer over the backhaul link may be carried out on a relay physical uplink shared channel (R-PUSCH). In S2, the relay base station transmits information on the backhaul link resources to the communication device. With respect to the terminal device 104, 106, the relay base station may broadcast transmission resource parameters on the broadcast control channel. For example, static transmission resource parameters, e.g. the TTI allocation, may be broadcasted as a system information broadcast (SIB) and/or master system information broadcast (MIB). When the static transmission resource parameters are changed, e.g. when the relay base station receives new static parameters, it may update the corresponding information elements in the broadcast messages. An update cycle may be longer than 40 ms, for example. The relay base station may be configured to forward the received semi-static and/or dynamic transmission resource parameters according to one of the following embodiments. In some embodiments, the transmission resources are forwarded as the SIB that is transmitted on an extended broadcast control channel or on a control channel addressed to a group identifier that is recognized by the terminal devices in the cell of the relay base station. Such a group identifier may be a System Information-Radio Network Temporary Identifier (SI-RNTI) of the LTE, for example. In some embodiments, the transmission resource parameters of the backhaul link are transmitted on an exclusive channel that may be embedded into a physical downlink control channel of the access link. In such embodiments, the exclusive channel may be addressed to a group address such that it is received and decoded by the terminal devices in the cell of the relay base station. With respect to the femtocell base station, the channel the relay base station uses to forward the transmission resource parameters of the backhaul link depends on an interface between the relay base station and the femtocell base station. The interface may be a wired interface based on DSL or X2 or S1 interface of the LTE, or it may be a wireless interface where the relay base station sees the femtocell base station as a conventional terminal device.

In addition to the transmission resource parameters of the backhaul link, the relay base station may be configured to transmit additional control information related to the multi-use of the resources of the backhaul link. Such information may comprise interference control information that is used to limit interference between the simultaneously used D2D link and the backhaul link. In one embodiment, the interference control information comprises a threshold parameter that limits the transmission power of the communication device(s) using the D2D link. The threshold parameter may be used to avoid interference towards the relay base station in downlink resources of the backhaul link. Some of such embodiments are described in greater detail below.

In S3, the communication device prepares to utilize the backhaul resources received in S2. S3 may comprise determining the transmission resource of the backhaul link and configuring transceiver components to communicate in the determined transmission resources, deriving the transmission power of the D2D link according to the receiver interference control information, negotiation about D2D communication, e.g. whether to transmit or receive, and determination of timing alignment (described in greater detail below). The negotiation about D2D communication may include channel contention for the D2D link, and the channel contention may be carried out through an autonomous or semi-autonomous resource scheduling scheme, e.g. through carrier sensing according to carrier-sensing multiple access with collision avoidance (CSMA-CA), for example. In such embodiments, the devices of the D2D link may carry out the resource scheduling through channel contention and/or negotiation. The negotiation may include transmission of a Request-to-Send (RTS) message by a party of the D2D link upon detection that a channel has been free for a determined time period, and the RTS message may be acknowledged by another party of the D2D link with a Clear-to-Send (CTS) message. The RTS/CTS negotiation may signal to other devices listening to the channel that the channel has already been reserved. This may be indicated by a network allocation vector (NAV) setting triggered by the transmission of the RTS message. The negotiation may be carried out on a common control channel (CCCH) which is an uplink control channel in the UMTS LTE, but it may be adapted for D2D resource negotiation for both uplink and downlink. In an embodiment, the CCCH messages include an extension for D2D resource negotiation, wherein the devices of the D2D link are configured to monitor for the CCCH for the D2D negotiations. The CCCH may be applied to negotiation of resource scheduling for both uplink and downlink of the backhaul link. In another embodiment, the communication devices of the D2D link are configured to utilize the CCCH for negotiating the channel access to the uplink resources of the backhaul link, while a dedicated signaling channel is utilized for negotiating the channel access to the downlink resources of the backhaul link. Accordingly, the signaling channel and the data channel for the backhaul downlink resources may be different from the signaling channel and the data channel for the backhaul uplink resources. The signaling channel(s) may be physically located in the uplink and/or downlink resources of the backhaul link.

Some embodiments utilize network-controlled scheduling of the D2D link in the resources of the backhaul link. In such embodiment, the relay base station may carry out the scheduling of the backhaul link resources to the communication devices of the D2D link. In such embodiment, the devices of the D2D link may request data transmission from the relay base station. The request may be forwarded to the other party of the D2D link. In response to approving the request, the relay base station may transmit the received transmission resource parameters of the backhaul link as scheduling commands, thereby scheduling the utilization of the backhaul resources for D2D link. The relay base station may, however, transmit also other information related to radio resource management of the backhaul resources, e.g. the interference control parameter and transmit power commands. With respect to the scheduling of the backhaul resources in the femtocell, the relay base station may forward the information on the backhaul resources to the femtocell base station, and the femtocell base station may then allocate the backhaul resources independently to terminal devices served and controlled by the femtocell base station.

In S4, the communication device utilizes the resources of the backhaul link for D2D communications, while the relay base station and the central base station communicate using the same time-frequency resources in S5. One embodiment of the invention enables spatial multi-use of the same time-frequency resources by two communication devices (the relay base station and the terminal device or the femtocell base station) in spatially different locations.

Figure 4:
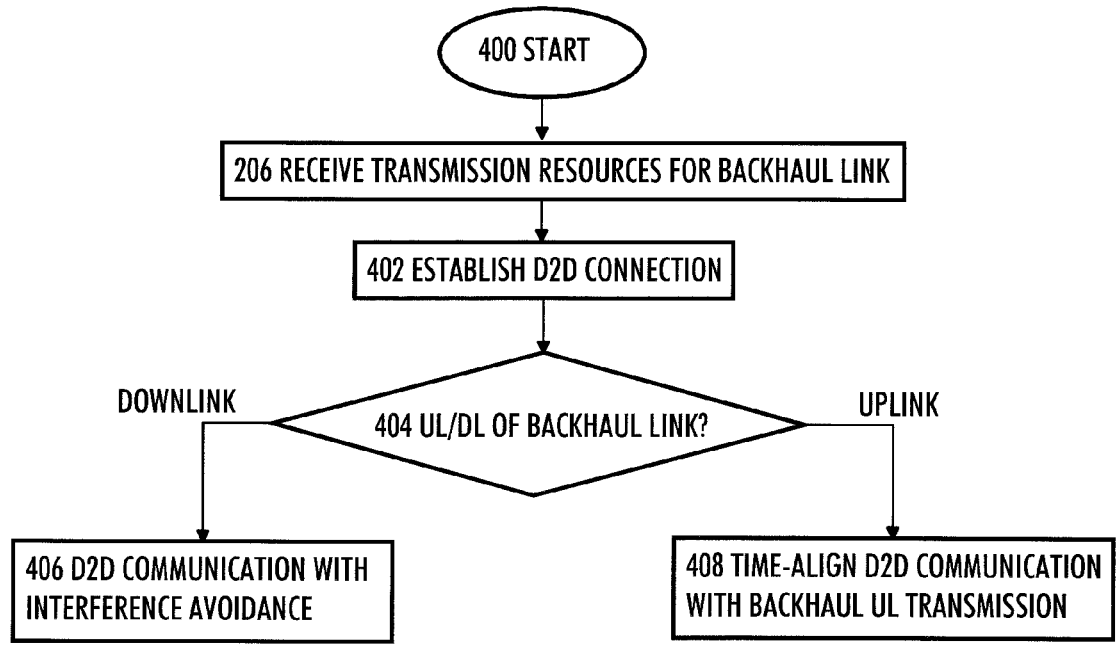
FIG. 4 illustrates an embodiment of a process for utilizing the backhaul link resources of a relay base station by another communication device in a cell covered by the relay base station.

FIG. 4 illustrates an embodiment of the block 208 of FIG. 2 in greater detail for the communication device using the resources of the backhaul link for the D2D connection. The process starts in block 400, and the communication device receives the transmission resources of the backhaul link according to any above-described embodiment in block 206. In block 402, the communication device establishes a D2D connection with another communication device. It should be appreciated that block 402 may be carried out before block 206. In the preparation for the D2D communications, in block 404 it may be determined whether the next transmission over the D2D link is carried out in uplink or downlink resources of the backhaul link. Block 404 may comprise determining the next communication resources of the backhaul link in which the D2D transmission is carried out, e.g. uplink TTI or downlink TTI of the backhaul link. In other words, in block 404 it may be determined whether the relay node is transmitting or receiving in the next TTI to which the D2D transmission is scheduled or being scheduled. The D2D transmission may include transmission by the communication device carrying out the process of FIG. 4.

If it is determined in block 404 that the communication device is scheduled to transmit over the D2D link on downlink resources of the backhaul link (relay base station is receiving), the process proceeds to block 406 in which the communication device may apply an interference control procedure. As mentioned above, the communication device may have received the interference control parameter from the relay base station. The communication device may then map the interference control parameter to the transmission power to be used for the D2D link. The interference control parameter may be calculated by the central base station or by the relay base station, and the interference control parameter may be calculated according to link quality of the backhaul link. The better the quality of the backhaul link, the more transmission power may be allowed for the communication device. The interference control parameter may, for example, define a maximum transmission power in a situation where the link quality between the relay base station and the communication device is ideal. In block 406, the communication device may estimate a quality of a link between the communication device and the relay base station in order to enable scaling the transmission power according to the link quality. The lower the link quality between the communication device and the relay base station, the higher transmission power may be applied to the D2D link. The link quality may be estimated from a pilot signal received from the relay base station, e.g. a broadcast pilot signal. The estimated link quality may include a path loss estimated according to a known transmit power of the pilot signal and a measured reception power of the pilot signal, for example. Then, the estimated link quality and the received interference control parameter may be mapped to the transmit power according to the following equation:

$$TX\_Power = ICP - Q_{UE\_RN}, \quad (1)$$

where ICP may represent the interference control parameter (in dB), and the $Q_{UE\_RN}$ may represent the path loss between the communication device and the relay base station (in dB). Thus computed transmission power (TX_Power) may then be applied to the D2D transmission carried out in the downlink resources of the backhaul link. The transmit power may be recalculated in connection with every D2D transmission, or it may be a semi-static parameter that is maintained for a plurality of D2D transmissions by the communication device without a recalculation. In the latter case, the recalculation may be triggered by an updated interference control parameter and/or a change in the link quality between the communication device and the relay base station, the recalculation may be carried out periodically and/or according to the mobility of the communication device. The result of the interference control and avoidance according to the embodiments may result in controlled interference towards the relay base station. As a consequence, the D2D transmissions carried out in the resource of the backhaul link causes interference that remains sufficiently low to be sustained by the relay base station, and the spectral efficiency is improved without degrading the performance of the backhaul link. The above-described procedure for limiting the transmission power may be carried out for the backhaul downlink resources, and a different transmit power control procedure may be applied to the backhaul uplink resources. Because of the different power control schemes for the uplink and the downlink, the communication device may apply different transmission powers for the uplink and downlink resources even if the radio channel between the devices of the D2D connection remains the same. It should be appreciated that some embodiments utilize other interference control schemes, or even no interference control.

Figure 5:
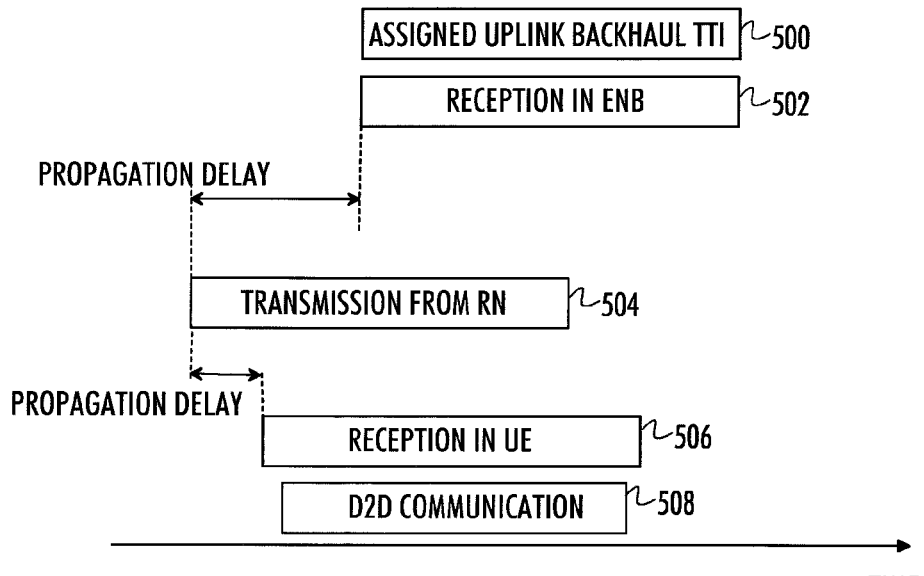
FIG. 5 illustrates timing alignment of a device-to-device connection when utilizing the backhaul link resources according to an embodiment of the invention.

If it is determined in block 404 that the communication device is scheduled to transmit over the D2D link on uplink resources of the backhaul link (relay base station is transmitting), the process proceeds to block 408 in which the communication device may time-align its D2D transmission to actual transmission timing of the relay base station. The central base station may have scheduled the uplink TTI (e.g. a sub-frame) in which the relay base station carries out the transmission. Due to a propagation delay caused by the travel of the radio signal through the radio channel, the relay base station may apply a timing advance to the scheduled TTI so as to ensure that the uplink transmission is received at the central base station accurately with the correct timing. FIG. 5 illustrates an example of the timing advance and the time-alignment carried out in block 408. Referring to FIG. 5, let us assume that the central base station has scheduled the backhaul uplink resources 500 (TTI and frequency resources) and that the relay base station has forwarded the information on the scheduled backhaul uplink resources 500 to the communication device. In order to account for the propagation delay, the relay base station carries out the uplink transmission 504 before the actual timing of the assigned TTI. As a consequence of the propagation delay, the uplink transmission is received in the central base station in the assigned TTI (numeral 502). The timing advance compensating the propagation delay may be provided by the central base station, or it may be calculated by the relay base station. Referring to block 408 in FIG. 4, the communication device may be configured to measure a reception timing of the uplink transmission carried out by the relay base station. As mentioned above, the communication device has received the TTI (e.g. a sub-frame identifier) and the frequency resources scheduled to the relay base station for the uplink. The communication device may then monitor for the TTI and the frequency resources so as to detect an actual reception timing of the uplink transmission in the communication device (numeral 506). There may be naturally a propagation delay caused by the radio channel between the communication device and the relay base station so the transmission timing 504 of the backhaul uplink transmission occurs before the reception timing 506 in the communication device. Upon determining the reception timing 506, the communication device carries out the D2D transmission 508 within the reception timing of the uplink backhaul transmission 506. The D2D transmission may be shorter than the TTI of the backhaul link in order to ensure that the D2D transmission is within the TTI of the backhaul link. For example, the TTI of the backhaul link may be 14 OFDM (orthogonal frequency division multiplexing) symbols in the UMTS LTE, while the D2D transmission is less than 14 OFDM symbols. In some embodiments, the D2D transmission may be made shorter by applying a shorter cyclic prefix than the cyclic prefix of the backhaul link. In one embodiment, the distance between the devices of the D2D link is short and, therefore, the effect of delay spread is lower, and a shorter cyclic prefix is applicable.

When the TTI of the backhaul uplink is a static or semi-static parameter, the communication device may determine the reception timing 506 from previous reception timings with respect to the scheduled TTI 500. As a consequence, the D2D transmission may maximize the utilization of the resources of the backhaul link. In some other embodiments, the uplink backhaul resources may be monitored, and the D2D transmission may be triggered upon detection of a signal in the monitored uplink backhaul resources. Such embodiments may improve adaptation to varying radio channel conditions and propagation delays. An advantage provided by the time-alignment carried out in block 408 may be, for example, that the interference caused by the relay base station to a receiver of the D2D link remains constant (or substantially constant) for the whole duration of the D2D transmission. In some embodiments, a distance between the communicating devices of the D2D link is short, and the propagation delay is similar for both devices. Therefore, the communication device may apply a D2D transmission timing it has calculated itself. In some embodiments, a receiver of the D2D transmission computes the transmission timing difference between the scheduled transmission 500 timing and the observed reception timing 506, and signals the timing difference to a transmitter. The transmitter may then apply the received timing difference to the D2D transmission. The interference caused by the D2D transmission towards reception of the central base station may be neglected, particularly when the communication device is not in a cell of the central base station. It should be appreciated that some embodiments do not utilize the time-alignment of block 408.

The communication device may be configured to apply both blocks 406 and 408 for backhaul downlink and uplink, respectively, only one of the blocks 406 and 408. It should also be appreciated that the communication device may apply a different interference avoidance procedure when the D2D transmission is carried out in transmission resources of the access link. Then, the communication device may use another interference control parameter that limits the transmission power to a level that may be sustained by other communication devices receiving over the access link in the same resources in which the D2D transmission is carried out. This second interference control parameter may also be provided by the relay base station in SIB transmission, for example. With respect to block 408 in connection with the access link resources, the communication device may carry out similar procedure by monitoring for uplink transmissions in the access link resources (from a terminal device to the relay base station), and align the D2D transmission to be carried out within the transmission timing of the monitored terminal device.

Figure 6:
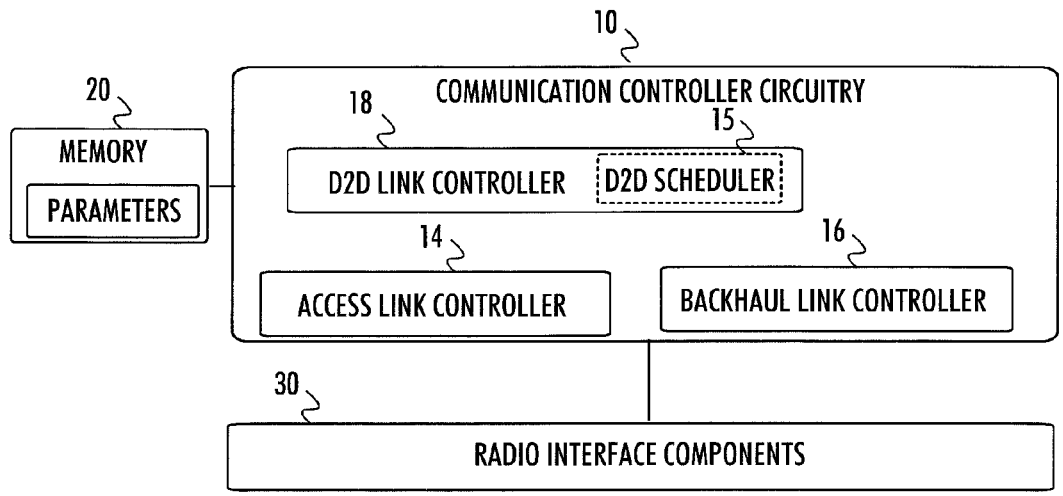
FIGS. 6 and 7 illustrate block diagrams of apparatuses according to some embodiments of the invention.

FIG. 6 illustrates an embodiment of an apparatus applicable to the relay base station configured to support D2D and cellular connections, for example. In some embodiments, the apparatus of FIG. 6 may be the relay base station. The apparatus may comprise a communication controller circuitry 10 configured to control cellular radio connections in a cell controlled by the relay base station and to provide support of the D2D connections. The communication controller circuitry 10 may comprise an access link controller circuitry 14 configured to control communications between the relay base station and terminal devices served by the relay base station. The access link controller circuitry 14 may configure radio resource management in the cell and schedule uplink and downlink transmissions in the access link. The communication controller circuitry 10 may further comprise a backhaul link controller circuitry 16 configured to control communications between the relay base station and a central base station with which the relay base station provides the relay services. The backhaul link controller circuitry 16 may receive operating parameters from the central base station via a radio interface, and configured the utilization of the backhaul link according to the received parameters. The parameters may include static, semi-static and/or dynamic parameters for the backhaul link. The backhaul link controller circuitry 16 may store current parameters in a memory 20. Operation of the backhaul link controller circuitry 16 and the access link controller circuitry 14 may be time-multiplexed with respect to the channel access. The communication controller circuitry 10 may further comprise a D2D link controller circuitry 18 configured to support the D2D connections in the cell. The D2D link controller circuitry 18 may retrieve the transmission resource parameters of the backhaul link from the memory 20 and/or receive them directly from the backhaul link controller circuitry 16. The D2D link controller circuitry may then be configured to formulate a control message comprising the transmission parameters and, optionally, other control information related to D2D communications in the backhaul resources, e.g. the interference control parameter. It may be seen that the D2D link controller circuitry 18 transforms the transmission resource parameters received over the backhaul link for transmission over the access link. The D2D link controller circuitry 18 may then configure the relay base station to broadcast or otherwise transmit the control message to communication devices in the cell. The control message may be transmitted over a radio interface and/or over a wired interface. The D2D link controller circuitry 18 may also be included as a sub-circuitry in the access link controller circuitry 14. When the relay base station is configured to carry out resource scheduling for the D2D connections, the D2D link controller circuitry 18 may further comprise a D2D scheduler circuitry 15 configured to schedule the transmission resources of the backhaul link to the communication devices in the cell.

The apparatus may further comprise one or more memories 20 storing computer programs configuring the apparatus to perform the above-described functionalities of the terminal device. The memory 20 may also store the transmission resource parameters of the backhaul link and the access link and other information needed for the connections supported by the relay base station. The parameters and the other information may comprise the above-mentioned transmission resources, interference control parameters, etc. The apparatus may further comprise radio interface components 30 providing the apparatus with radio communication capabilities with the radio access network. The radio interface components 30 may comprise standard well-known components such as amplifier, filter, frequency-converter, (de)modulator, and encoder/decoder circuitries and one or more antennas.

In some embodiments, the apparatus carrying out the certain embodiments of the invention in the relay base station, for example, comprises at least one processor and at least one memory including a computer program code, wherein the at least one memory and the computer program code are configured, with the at least one processor, to cause the apparatus to carry out the steps of any one of the processes of FIGS. 2 to 5 or any other embodiment described above that is carried out in the relay base station. In further embodiments, the at least one memory and the computer program code are configured, with the at least one processor, to cause the apparatus to carry out any one of the embodiments related to the enabling multi-use of the backhaul link transmission resources for D2D connections in the cell controlled by the relay base station. Accordingly, the at least one processor, the memory, and the computer program code form processing means for carrying out embodiments of the present invention in the relay base station.

In some embodiments, the apparatus may comprise an input/output interface to provide means for communicating with the femtocell base station over an interface other than the radio interface. The connection between the apparatus and the femtocell base station may comprise a DSL connection, or it may be an interface of the cellular telecommunication system, e.g. the S1 or X2 connection of the UMTS LTE. The connection protocols may comprise the Internet protocol (IP).

Figure 7:
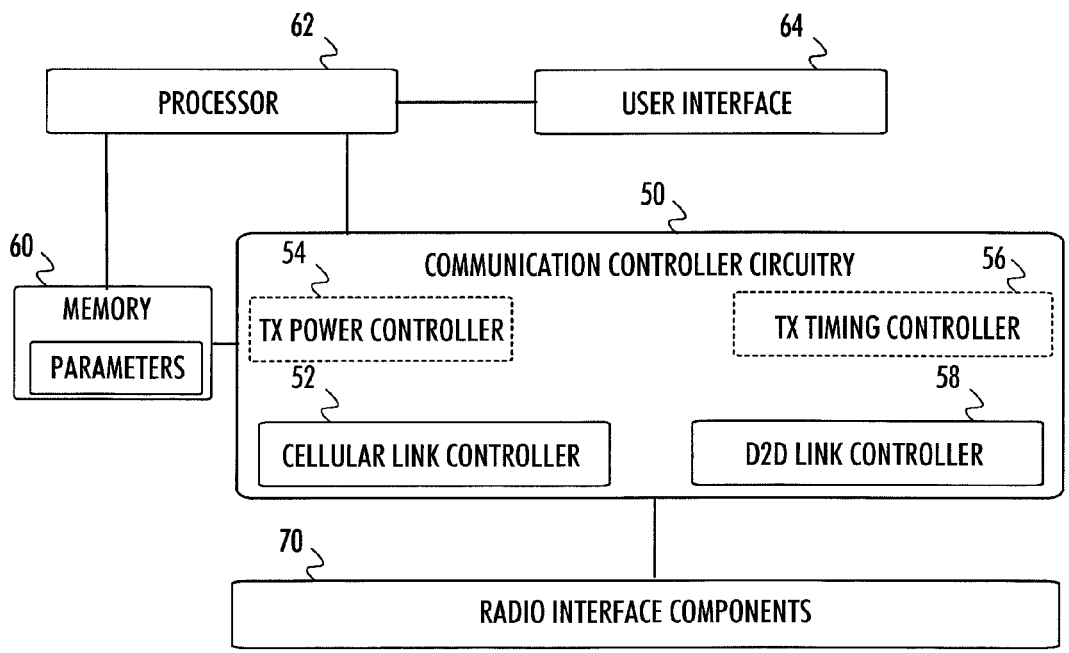

FIG. 7 illustrates one embodiment of an apparatus applicable to a communication device configured to carry out D2D communications in the resources of the backhaul link. In some embodiments, the apparatus of FIG. 7 may be the above-mentioned terminal device of the cellular telecommunication system or the femtocell base station configured to operate on a coverage area of the relay base station by utilizing the resources of the backhaul link. The apparatus may comprise a communication controller circuitry 50 configured to control cellular radio connections and D2D connections. The communication controller circuitry 50 may comprise a cellular link controller circuitry 52 configured to control operations related to cellular communications with the radio access network of the cellular telecommunication system. The cellular link controller circuitry 52 may be configured to control the communications between the communication device and the radio access network in order to configure the communication device to operate as a terminal device of the cellular telecommunication system and/or as the femtocell base station supporting radio interface specifications of the cellular telecommunication system. When the communication device is the terminal device, the cellular link controller circuitry 52 may configure the communication device to support functionalities of the terminal device of the cellular telecommunication system. When the communication device is the femtocell base station, the cellular link controller circuitry 52 may configure the communication device to provide terminal devices located in the femtocell with cellular telecommunication coverage, e.g. by carrying out radio resource management for the terminal devices and establishing D2D links with the terminal devices in the resources of the backhaul link of the relay base station. The cellular link controller circuitry 52 may be configured to receive the parameters related to the multi-use of the resources of the backhaul link in a broadcast message from the relay base station. The communication controller circuitry 50 may further comprise a D2D link controller circuitry 58 configured to operate D2D connections in the communication device. The D2D link controller circuitry may be configured to receive the transmission resources of the backhaul link from a memory 60, directly from the cellular link controller, or by other means. Then, the D2D link controller circuitry 58 may configure the communication device to carry out the D2D communications in the resources of the backhaul link. The channel access may be implemented by any one of the above-described schemes.

The communication controller circuitry 50 may further comprise a transmit power controller circuitry 54 configured to realize block 406 of FIG. 4 so as to control the transmission power in downlink resources of the backhaul link according to the received interference control parameter. The transmit power controller circuitry 54 may receive an input from the communication controller circuitry 50 or from the D2D link controller circuitry 58 to carry out the transmit power calculation. The transmit power controller circuitry 54 may then output the resulting transmit power to the D2D link controller or directly to amplification components of the communication device. The communication controller circuitry 50 may further comprise a transmission timing controller circuitry 56 configured to adjust the transmission timing with respect to the received TTI of the uplink backhaul resources. The transmission timing controller circuitry 56 may be configured to carry out any one of the above-described embodiments of block 408 of FIG. 4. The transmission timing controller circuitry 56 may monitor the offset of the observed timing of the uplink TTI with respect to the absolute timing of the uplink TTI (as received from the relay base station) for a determined time period or a determined number of TTIs and, then, adjust the transmission timing of the D2D connection according to observed average offset.

The apparatus may further comprise one or more processors 62 carrying out general operations in the communication device. The processor may be configured to execute operating system instructions, execute applications, and control various peripheral devices connected to the apparatus. The apparatus may further comprise a user interface 64 controlled by the processor 62 and comprising a display, an input device (a keypad or a keyboard), an audio output device, etc., and the data traffic may be transmitted to the cellular link and/or to the D2D link in response to commands received from a user through the user interface 64. Similarly, data received through the cellular link and/or through the D2D link may be displayed to the user through the user interface 64.

In addition to the parameters of the backhaul link, the memory 60 may store computer programs configuring the apparatus to perform the above-described functionalities of the communication device. The memory 60 may also store communication parameters and other information needed for carrying out the D2D communications in the resources of the backhaul link. The parameters may include the current transmission resources of the backhaul link, as received from the relay base station (or by other means). The parameters and the other information may comprise the above-mentioned database(s), channel estimates, etc. The apparatus may further comprise radio interface components 70 providing the apparatus with radio communication capabilities with the radio access network. The radio interface components 70 may comprise standard well-known components such as amplifier, filter, frequency-converter, (de) modulator, and encoder/decoder circuitries and one or more antennas. In some embodiments where the apparatus is the femtocell base station, the apparatus may comprise an input/output interface to provide the connection with the relay base station over an interface other than the radio interface. The connection may comprise a DSL connection, or it may be an interface of the cellular telecommunication system, e.g. the S1 or X2 connection of the UMTS LTE. The connection protocols may comprise the Internet protocol (IP).

In some embodiments, the apparatus carrying out the embodiments of the invention in the base station, for example, comprises at least one processor and at least one memory including a computer program code, wherein the at least one memory and the computer program code are configured, with the at least one processor, to cause the apparatus to carry out the steps of at least one of the processes of FIGS. 2 to 5 or any other embodiment described above that is carried out in the communication device. In further embodiments, the at least one memory and the computer program code are configured, with the at least one processor, to cause the apparatus to carry out any one of the embodiments related to the D2D communications in resources of the backhaul link. Accordingly, the at least one processor, the memory, and the computer program code form processing means for carrying out embodiments of the present invention in the communication device.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The processes or methods described in FIGS. 4 to 8 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The some embodiments of the invention are applicable to cellular or mobile telecommunication systems defined above but also to other suitable telecommunication systems. The cellular telecommunication system may have a fixed infrastructure providing wireless services to subscriber terminals and having the same cellular structure as another cellular telecommunication system from. The protocols used, the specifications of mobile telecommunication systems, their network elements and subscriber terminals, develop rapidly. Such development may require extra changes to the certain described embodiments. Therefore, all words and expressions should be interpreted broadly and they are intended to illustrate, not to restrict, the embodiment.

It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
receiving, at a relay base station of a cellular radio network, parameters defining transmission resources for a backhaul link between the relay base station and another base station of the cellular radio network;
transmitting, by the relay base station, at least some of the received parameters of the backhaul link to at least one communication device operating in a cell covered by the relay base station so as to enable simultaneous multi-utilization of-the transmission resources of the backhaul link;
communicating, by the relay base station, relay data in the transmission resources defined by the received parameters; and
transmitting, by the relay base station, interference control information to the at least one communication device, wherein the interference control information includes interference information for at least one device-to-device link that utilizes the transmission resources of the backhaul link, and wherein the interference information includes a threshold parameter that limits, when the at least one communication device is utilizing the transmission resources of the backhaul link for the at least one device-to-device link, transmission power of the at least one communication device.

2. The method of claim 1, further comprising:
receiving, at the relay base station, an information element indicating static transmission timing assigned to the relay base station for use in the backhaul link; and
transmitting, by the relay base station, the static transmission timing of the backhaul link to the at least one communication device.

3. The method of claim 1, further comprising:
receiving, at the relay base station, a frequency resource allocation assigned to the relay base station; and
transmitting, by the relay base station, the frequency resource allocation to the at least one communication device.

4. The method of claim 1, further comprising broadcasting, by the relay base station, at least some of the received parameters of the backhaul link to the at least one communication device on a radio broadcast control channel.

5. The method of claim 1, wherein the limiting of the transmission power for the device-to-device link avoids interference with the communication of relay data between the relay base station and another base station using a same transmission resources.

6. A method, comprising:
receiving, at a first communication device located in a cell covered by a relay base station of a cellular radio network, a message comprising parameters defining transmission resources for a backhaul link between the relay base station and another base station of the cellular radio network;
determining, by the first communication device, the transmission resources of the backhaul link from the received message;
utilizing, by the first communication device, the transmission resources of the backhaul link for a device-to-device link established between the first communication device and a second communication device; and
receiving, at the first communication device, interference control information sent from the relay base station, wherein the interference control information includes interference information for the device-to-device link that utilizes the transmission resources of the backhaul link, and wherein the interference information includes a threshold parameter that limits, when the first communication device is utilizing the transmission resources of the backhaul link for the device-to-device link, transmission power of the first communication device.

7. The method of claim 6, further comprising:
determining, by the first communication device, transmission timing and frequency resources of the backhaul link; and
communicating, by the first communication device, over the device-to-device link in the transmission timing and the frequency resources of the backhaul link.

8. The method of claim 6, further comprising:
receiving, at the first communication device, an interference control parameter;
determining, by the first communication device, transmission power for the device-to-device link on the basis of the received interference control parameter; and
causing transmission over the device-to-device link in the transmission resources of the backhaul link with the determined transmission power.

9. An apparatus comprising:
at least one processor; and
at least one memory including a computer program code, wherein the at least one memory and the computer program code are configured, with the at least one processor, to at least:
receive, at the apparatus, parameters defining transmission resources for a backhaul link between the apparatus of a cellular radio network and another base station of the cellular radio network;

transmit, by the apparatus, at least some of the received parameters of the backhaul link to at least one communication device operating in a cell covered by the apparatus so as to enable simultaneous multi-utilization of the transmission resources of the backhaul link;

communicate, by the apparatus, relay data in the transmission resources defined by the received parameters; and transmit, by the apparatus, interference control information to the at least one communication device, wherein the interference control information includes interference information for at least one device-to-device link that utilizes the transmission resources of the backhaul link, and wherein the interference information includes a threshold parameter that limits, when the at least one communication device is utilizing the transmission resources of the backhaul link for the at least one device-to-device link, transmission power of the at least one communication device.

10. The apparatus of claim 9, wherein the apparatus is further configured to at least:

receive, at the apparatus, an information element indicating static transmission timing assigned to the apparatus for use in the backhaul link; and transmit, by the apparatus, the static transmission timing of the backhaul link to the at least one communication device.

11. The apparatus of claim 9, wherein the apparatus is further configured to at least:

receive, at the apparatus, a frequency resource allocation assigned to the apparatus; and transmit, by the apparatus, the frequency resource allocation to the at least one communication device.

12. The apparatus of claim 9, wherein the apparatus is further configured to at least broadcast at least some of the received parameters of the backhaul link to the at least one communication device on a radio broadcast control channel.

13. The apparatus of claim 9, wherein the apparatus is further configured to at least transmit an interference control parameter limiting interference of the at least one communication device towards the relay base station.

14. The apparatus of claim 9, wherein the apparatus is further configured to at least:

receive the parameters defining the transmission resources for the backhaul link on a relay physical downlink control channel between the apparatus and the other base station; and transmit the at least some of the received parameters as system information broadcast on a physical broadcast channel.

15. The apparatus of claim 9, wherein the apparatus comprises a relay base station further comprising radio interface components to provide the relay base station with a radio communication capability.

16. An apparatus, comprising:

at least one processor; and at least one memory including a computer program code, wherein the at least one memory and the computer program code are configured, with the at least one processor, to at least:

receive, at the apparatus located in a cell covered by a relay base station of a cellular radio network, a message comprising parameters defining transmission resources for a backhaul link between the relay base station of the cellular radio network and another base station of the cellular radio network;

determine, by the apparatus, the transmission resources of the backhaul link from the received message;

utilize, by the apparatus, the transmission resources of the backhaul link for a device-to-device link established between the first communication device and a second communication device; and receive, at the apparatus, interference control information sent from the relay base station, wherein the interference control information includes interference information for the device-to-device link that utilizes the transmission resources of the backhaul link, and wherein the interference information includes a threshold parameter that limits, when the apparatus is utilizing the transmission resources of the backhaul link for the device-to-device link, transmission power of the apparatus.

17. The apparatus of claim 16, wherein the apparatus is further configured to at least:

receive an interference control parameter;

determine transmission power for the device-to-device link on the basis of the received interference control parameter; and transmit over the device-to-device link in the transmission resources of the backhaul link with the determined transmission power.

18. The apparatus of claim 17, wherein the interference control parameter indicates a maximum allowed interference towards the relay base station, and wherein the apparatus is further configured to at least:

determine a path loss between the relay node and the first communication device;

determine the transmission power for the device-to-device link on the basis of the determined path loss and the received interference control parameter; and apply the determined transmission power when using downlink transmission resources of the backhaul link and applying a different transmission power when using uplink transmission resources of the backhaul link.

19. The apparatus of claim 16, wherein the apparatus is further configured to at least:

detect transmission of the relay base station in the transmission resources of the backhaul link;

determine an offset between a transmission time interval assigned to the relay base station and a time interval when the transmission of the relay base station is observed by the apparatus; and cause communication over the device-to-device link during a time interval offset from the transmission time interval assigned to the relay base station by at least the determined offset.

20. A computer program product comprising at least one non-transitory computer readable storage medium having computer program instructions stored therein, the execution of which result in operations comprising:

receiving, at a relay base station of a cellular radio network, parameters defining transmission resources for a backhaul link between the relay base station and another base station of the cellular radio network;

transmitting, by the relay base station, at least some of the received parameters of the backhaul link to at least one communication device operating in a cell covered by the relay base station so as to enable simultaneous multi-utilization of the transmission resources of the backhaul link;

communicating, by the relay base station, relay data in the transmission resources defined by the received parameters; and transmitting, by the relay base station, interference control information to the at least one communication device, wherein the interference control information includes interference information for at least one device-to-device link that utilizes the transmission resources of the backhaul link, and wherein the interference information includes a threshold parameter that limits, when the at least one communication device is utilizing the transmission resources of the backhaul link for the at least one device-to-device link, transmission power of the at least one communication device.

21. A computer program product comprising at least one non-transitory computer readable storage medium having computer program instructions stored therein, the execution of which result in operations comprising:

receiving, at a first communication device located in a cell covered by a relay base station of a cellular radio network, a message comprising parameters defining transmission resources for a backhaul link between the relay base station and another base station of the cellular radio network;

determining, by the first communication device, the transmission resources of the backhaul link from the received message;

utilizing, by the first communication device, the transmission resources of the backhaul link for a device-to-device link established between the first communication device and a second communication device; and receiving, at the first communication device, interference control information sent from the relay base station, wherein the interference control information includes interference information for the device-to-device link that utilizes the transmission resources of the backhaul link, and wherein the interference information includes a threshold parameter that limits, when the first communication device is utilizing the transmission resources of the backhaul link for the device-to-device link, transmission power of the first communication device.

* * * * *